United States Patent [19]
Fleenor

[11] 3,794,193
[45] Feb. 26, 1974

[54] CARGO HANDLING MECHANISM
[76] Inventor: Warren O. Fleenor, 8250 W. Bergen Rd., Leroy, N.Y. 14482
[22] Filed: Dec. 17, 1971
[21] Appl. No.: 209,109

[52] U.S. Cl. .............................. 214/75 G, 214/75 T
[51] Int. Cl. .............................................. B60p 1/44
[58] Field of Search. 214/75 R, 75 G, 75 T, 16.4 A; 104/197

[56] References Cited
UNITED STATES PATENTS

| | | | |
|---|---|---|---|
| 3,368,704 | 2/1968 | Pope | 214/75 T |
| 3,610,445 | 10/1971 | Kitchen | 214/16.4 A |
| 3,371,805 | 3/1968 | Himes | 214/75 T |
| 3,024,926 | 3/1962 | Nolden | 214/75 T |
| 3,232,455 | 2/1966 | Fountain et al. | 187/19 |
| 306,993 | 10/1884 | Armentrout | 187/19 |
| 3,051,340 | 8/1962 | Ely | 214/85 |
| 3,382,816 | 5/1968 | Goforth et al. | 104/197 |

Primary Examiner—Gerald M. Forlenza
Assistant Examiner—Lawrence J. Oresky

[57] ABSTRACT

A cargo handling mechanism for use on an enclosing structure, such as a railroad car or the like, for loading cargo into or unloading cargo from the car. The cargo handling mechanism is preferably mounted in a vertical orientation for lateral movement, and has a door that is vertically movable to a selected position, and then pivotally movable in the selected position between open and closed positions. The cargo handling mechanism is a self-contained unit containing the controls and power source for laterally moving the mechanism, and vertically and pivotally moving the door. The lateral movement of the mechanism is desirable for horizontally aligning the door with a desired cargo space in the enclosing structure. Once aligned, the vertical movement of the door is desirable for aligning the lower end of the door with the cargo-supporting surface in the enclosing structure. The door is pivotally movable from a normaly closed position, in which it blocks entry to the enclosing structure and assumes a compact position for transport and handling of the mechanism, to an open position, in which the door forms a platform over which cargo may be loaded into or unloaded from the enclosing structure.

10 Claims, 14 Drawing Figures

INVENTOR.
WARREN O. FLEENOR

BY

ATTORNEY

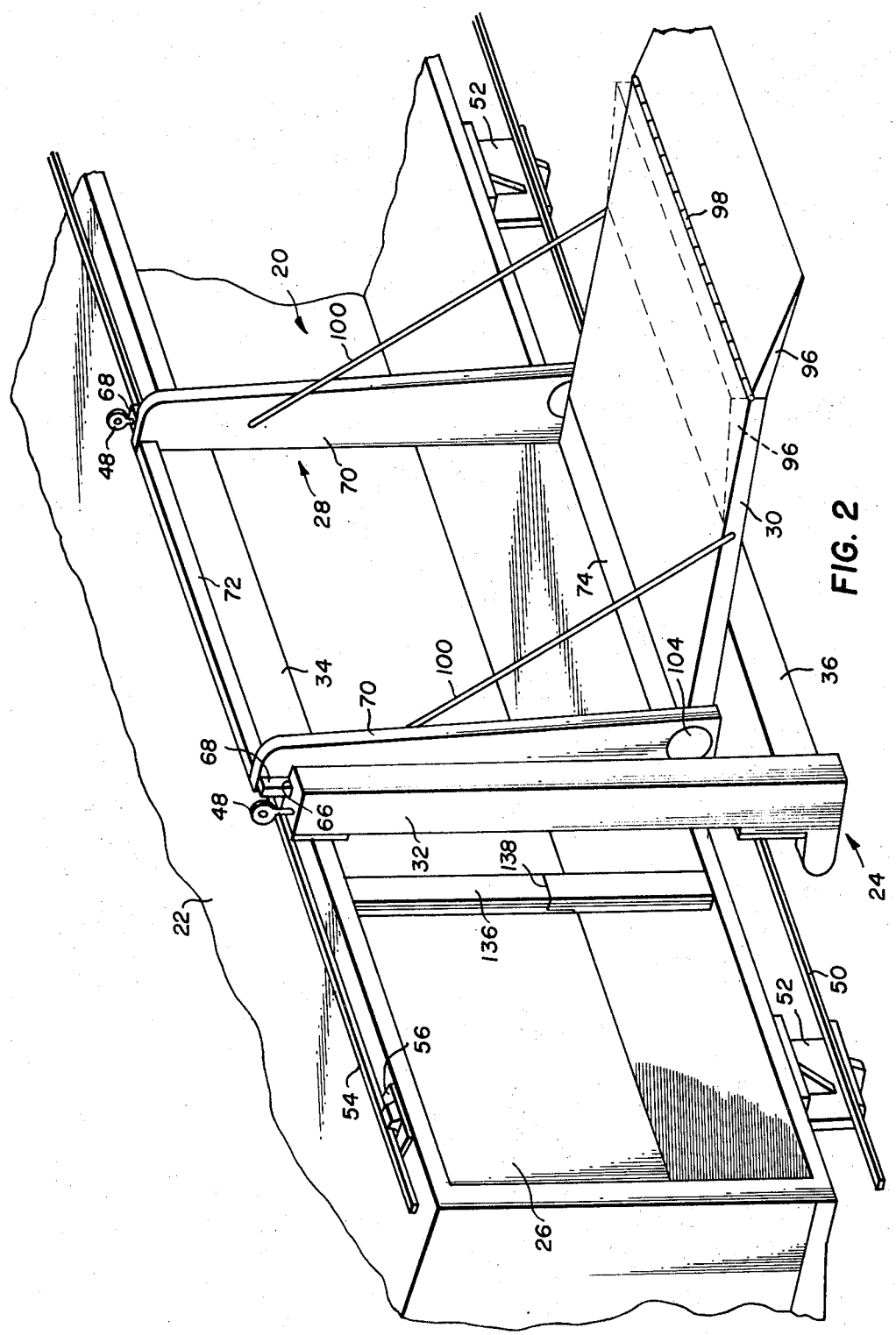

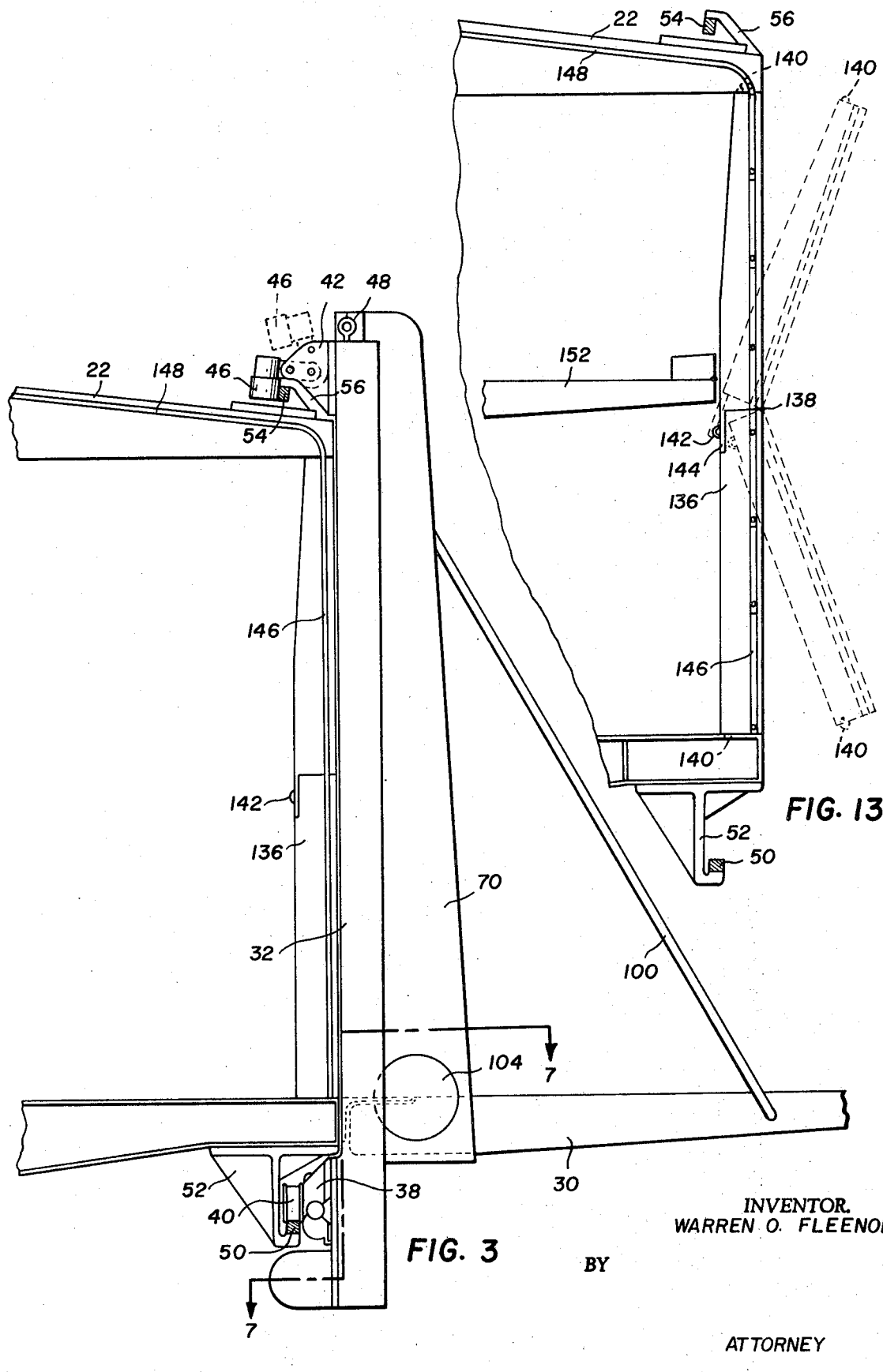

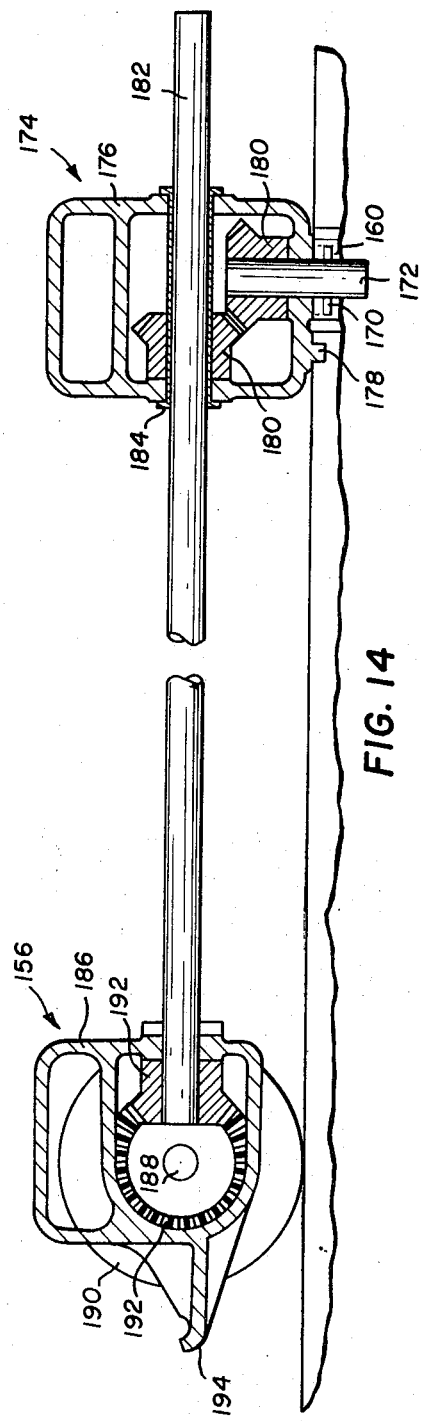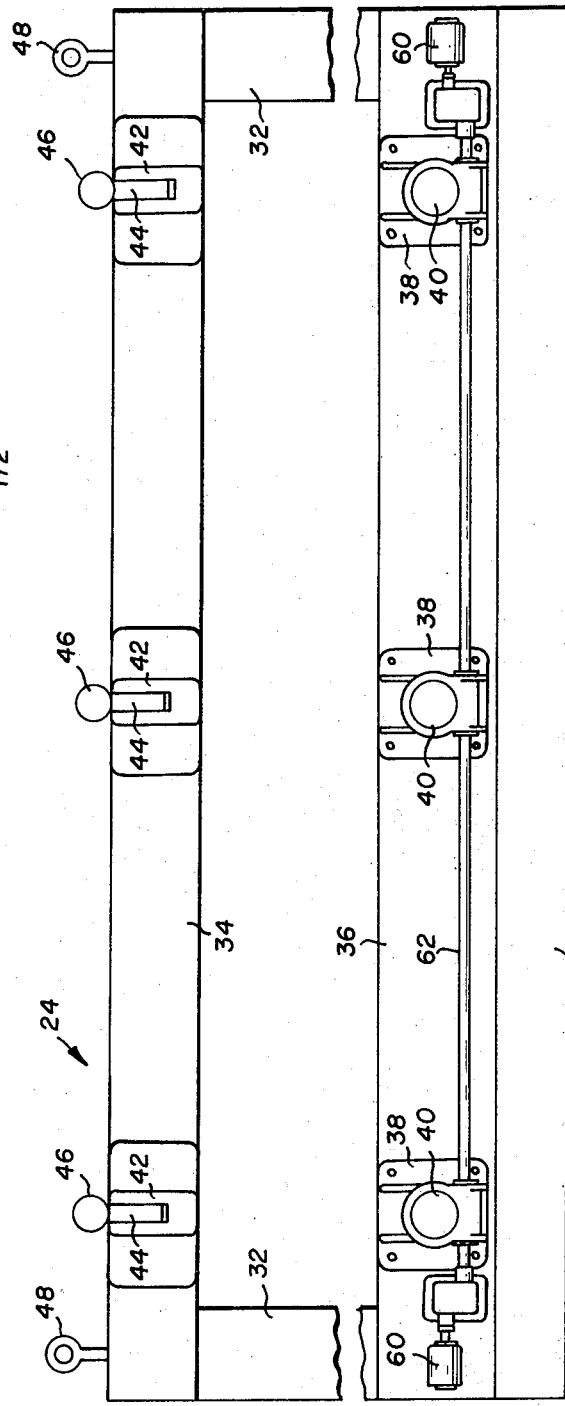

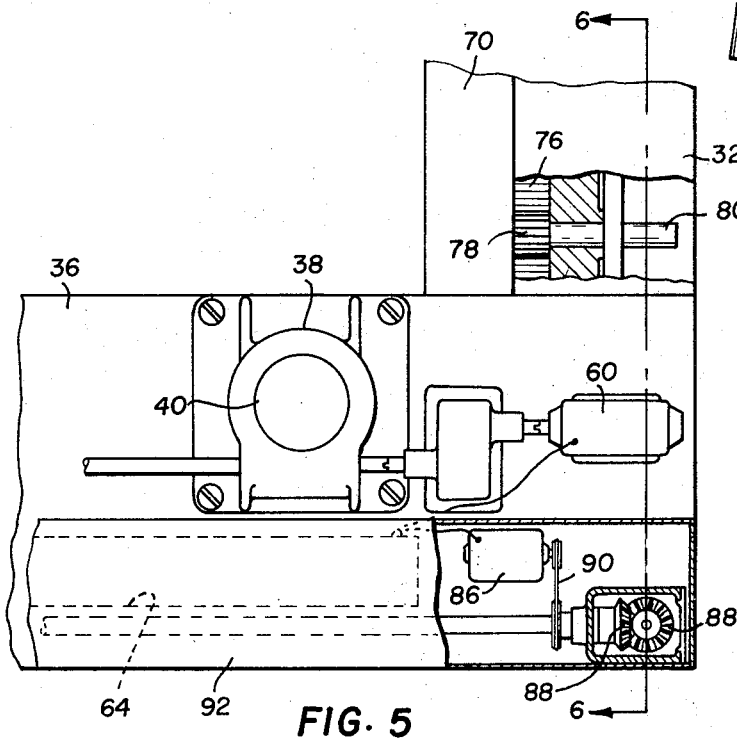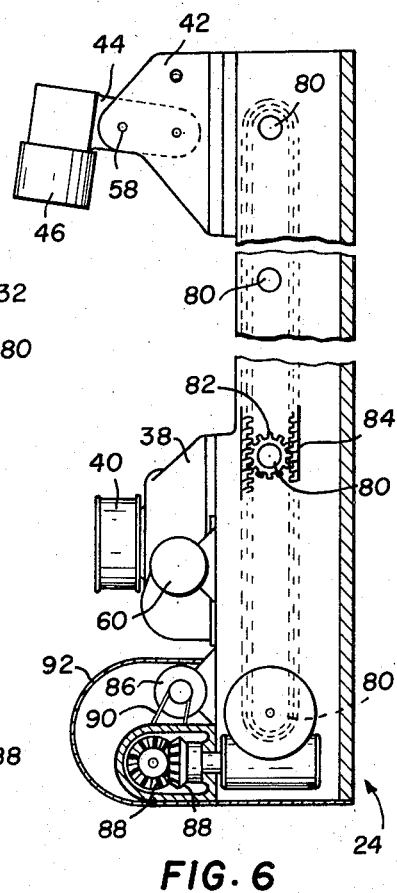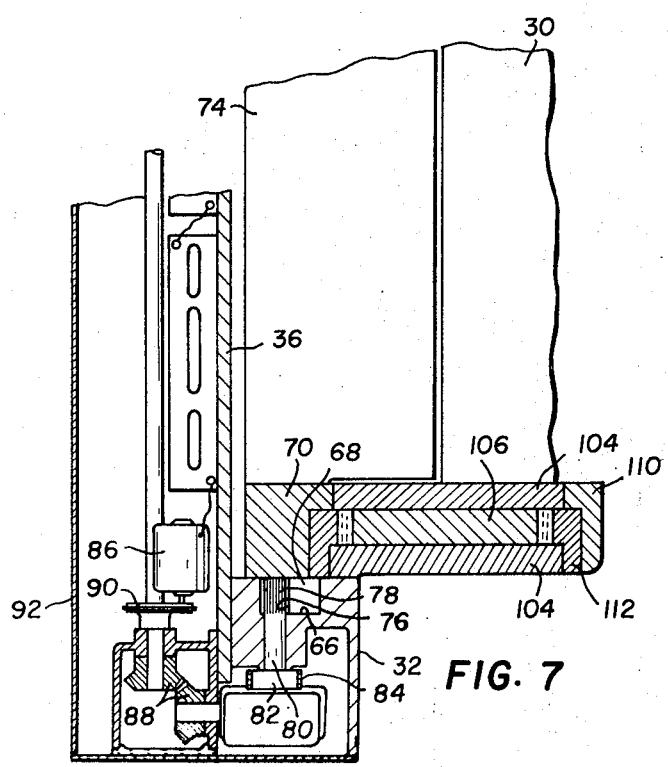

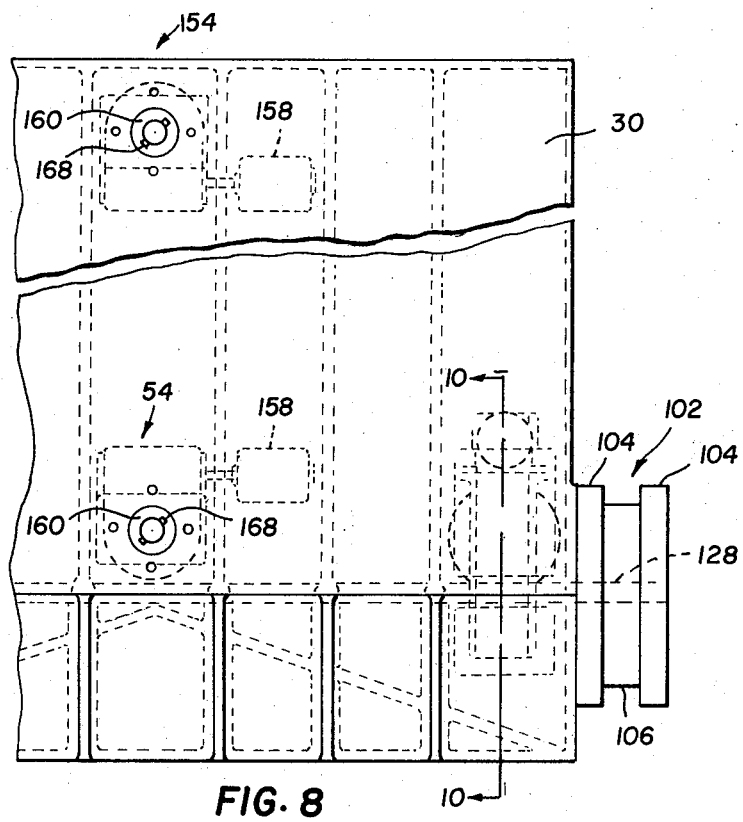
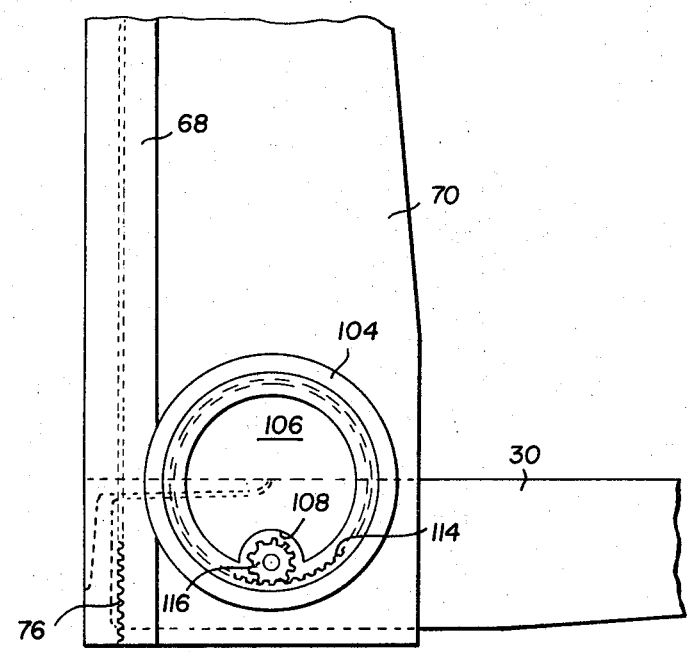

3,794,193

CARGO HANDLING MECHANISM

BACKGROUND OF THE INVENTION

1. Field of the Invention

This invention relates generally to material handling equipment, and more specifically to a cargo handling mechanism to facilitate loading cargo into or unloading cargo from an enclosing structure, such as a railroad car.

2. Description of the Prior Art

At the present time, the railroad transportation system, which involves the loading of cargo into railroad cars at an embarkation point, transporting cargo to a destination point and unloading the cargo at the destination point, is cumbersome, time-consuming, and costly. In such a transportation system, the cargo is initially loaded into a railroad car at a loading station on a railroad siding. Each empty railroad car is transported to a loading position at a loading ramp, and the cargo loaded into the car munaully or by means of fork trucks or the like. After a predetermined number of cars are loaded by such means, the cars are switched by a locomotive onto a transfer railroad spur, where they are attached to railroad cars being pulled by a freight train on the main track. When each car reaches its destination, it is detached from the freight train and moved onto a transfer spur, and form there transferred to an unloading station where the cargo is unloaded manually or by fork trucks. Some of the disadvantages of the afore-mentioned railroad cargo transportation system is that the time required to transport cargo from the point of embarkation to a destination is unduly long. Also, due to the many handling steps along the way, the cost of transporting the cargo is extremely high. Applicant's cargo handling mechanism is believed to obviate these and other disadvantages of the present railroad cargo transportation system by introducing a transportation system in which railroad cars may be quickly loaded and unloaded while on the main track, thereby eliminating the necessity for switching cars from the main track for loading and unloading. In addition, Applicant's cargo handling mechanism provides an inexpensive means for loading cargo into or unloading cargo from enclosing structures, such as railroad cars.

SUMMARY OF THE INVENTION

This invention includes within its scope a cargo handling mechanism for loading cargo into or unloading cargo from an enclosing structure, such as a railroad car. In a preferred embodiment of the invention, the mechanism comprises a support frame which, when mounted on an open side of the enclosing structure, is movable laterally in a horizontal direction for aligning the mechanism with a desired portion of the cargo space in the enclosing structure. The support frame slidably supports an elevator frame for vertical movement, and the vertical frame pivotally supports a door. The elevator frame is vertically moved until the lower end of the door is aligned with the floor supporting the cargo in the enclosing structure. The door is then pivoted from its normal closed position, in which the door is in a vertical orientation and blocks the opening in the vertical frame, to an open position, in which the door is substantially horizontal and forms a platform over which cargo may be moved into or out of the enclosing structure. The power source for moving the supporting frame, elevator frame, and door is contained within the cargo handling mechanism.

More specifically, the cargo handling mechanism of this invention comprises a support frame which may be releasably or permanently attached to upper and lower rails along the open side of an enclosing structure, such as a railroad car. The support frame is adapted to be laterally movable along the car rails in a horizontal direction into alignment with any portion of the cargo space. The support frame slidably supports an elevator frame for up or down movement in a vertical direction. The elevator frame is slidably moved vertically until the pivoted end of a door supported thereby is substantially in alignment with the car surface supporting the cargo. The elevator frame pivotally supports the door for pivotal movement between a closed position, in which the door is vertically oriented and blocks off the vertical frame opening, and an open position, in which the door forms a substantially horizontal platform over which cargo may be moved into or from the car. The power source for the support frame is mounted within the support frame, the power source for the elevator frame is mounted within the elevator frame, and the power source for pivotally moving the door is mounted within the door.

One of the objects of the present invention is to provide a cargo handling mechanism for improving the ease and rapidity of loading cargo into or unloading cargo from an enclosing structure, such as a railroad car.

Another object of the invention is to provide a cargo handling mechanism that eliminates the necessity for switching railroad cars from a main track for loading and unloading.

Another object of the invention is to provide a cargo handling mechanism that simplifies the railroad cargo transportation system, resulting in more prompt and less costly service.

Another object of the invention is to provide a cargo handling mechanism for loading cargo into and unloading cargo from an enclosing structure, in which the cargo handling mechanism is of simple design and construction, thoroughly reliable and efficient in operation, and economical to manufacture.

Another object of the invention is to provide a cargo handling mechanism for loading cargo into and unloading cargo from an enclosing structure, in which the power source for the mechanism is contained within the mechanism.

Another object of the invention is to provide a cargo handling mechanism that may be releasably or permanently attached on the open side of an enclosing structure, such as a railroad car.

The invention and its objects and advantages will become more apparent from the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 is a segmental, enlarged perspective view of the cargo handling mechanism of FIG. 1;

FIG. 3 is a segmental, side elevational view of the cargo handling mechanism of FIG. 2;

FIG. 4 (sheet 4 of the drawings) is a rear elevational view of the support frame of the cargo handling mechanism of FIG. 2;

FIG. 5 is a segmental, enlarged view of a portion of the mechanism of FIG. 3 with portions thereof broken away, and sectioned to show a part of the support frame drive mechanism;

FIG. 6 is a section view taken substantially along line 6—6 of FIG. 5;

FIG. 7 is an enlarged, segmental view of the mechanism, taken substantially along line 7—7 of FIG. 3;

FIG. 8 is a segmental view of only the door illustrated in FIG. 7, showing in greater detail the pivot and drive mechanism for coupling the door to the vertical frame;

FIG. 9 is a side elevational view of the elevator frame and door of the mechanism illustrated in FIG. 7;

FIG. 13 (sheet 3 of the drawings) is a segmental side elevational view of a railroad car illustrating releasable posts supporting a flexible door; and FIG. 14 (sheet 4 of the drawings) is a side elevational view in section showing a cargo cart-moving mechanism powered by the door.

DESCRIPTION OF THE PREFERRED EMBODIMENTS

Figure 1:
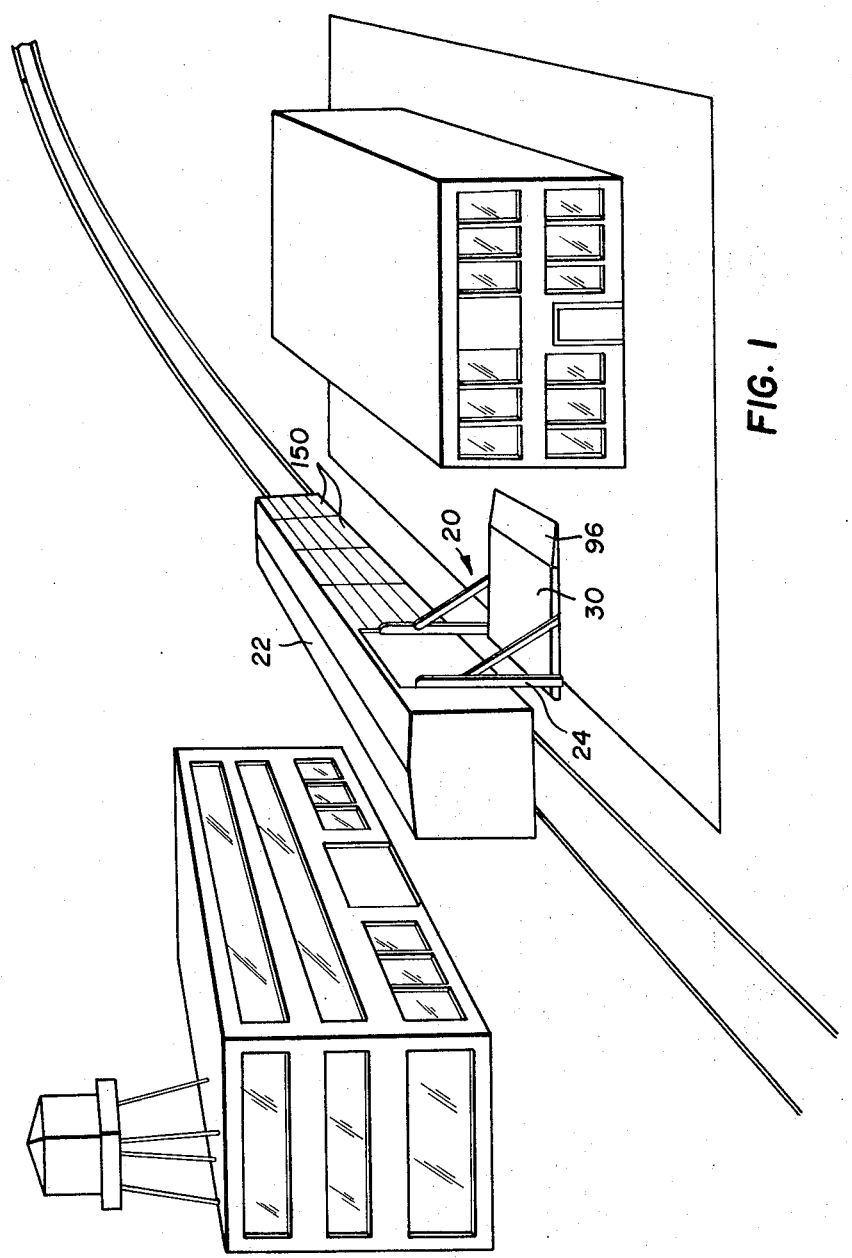
FIG. 1 is a perspective view of a portion of a railroad transportation system in which the cargo handling mechanism (illustrated schematically) of this invention is embodied.

Because the railroad transportation system is well known, the present description will be directed in particular to elements forming part of or cooperating more directly with the present invention. Railroad car structure and others not specifically shown or described herein should be understood to be selectable from those known in the art.

With reference to the drawings (particularly FIGS. 1 and 2), a cargo handling mechanism of this invention, generally designated by the numeral 20, is illustrated mounted on the openable side of a railroad car 22. Although this cargo handling mechanism 20 is particularly adaptable for use with railroad cars, it may be used in connection with any other enclosing structure, such as a warehouse or the like. The cargo handling mechanism 20 (FIG. 2) essentially comprises three parts, namely, a sipport frame 24 mountable on the enclosing structure and laterally movable in a horizontal direction relative to a cargo access opening 26 therein, an elevator frame 28 slidably supported by support frame 24 and vertically movable up or down, and a door 30 supported by elevator frame 28 for pivotal movement between open and closed positions.

The support frame 24 comprises a pair of side posts 32 (only one of which is visible in FIG. 2) secured together at the top and bottom by a pair of cross members 34,36, respectively. The lower cross member 36 has a plurality of housings 38 (FIGS. 4 and 6) secured thereto for supporting stub shafts to which support rollers 40 are secured. The upper cross member 34 has a plurality of brackets 42 secured thereto, each adapted to pivotally support an arm 44 which, in turn, rotatably supports a transversely extending shaft to which rollers 46 are secured. The support frame 24 may be lifted by any suitable means (such as a crane having a cable hook for engaging eyelets 48 on the upper member 32) and mounted on a railroad car 22 or the like with the lower rollers 40 resting on a lower rail 50 (FIG. 1) secured by brackets 52 to the railroad car. The upper rollers 46 are moved from their retracted position (dotted in FIG. 3) to a locked position (full lines in FIG. 3), causing the rollers to engage the rear side of an upper rail 54, also secured to the car by brackets 56 or the like. The upper roller arm 44 may be held in its locked and retracted positions by any suitable detent, such as a retractable bolt 58 on bracket 42 engageable with an opening in the arm. The mounted support frame 24 is laterally movable on rails 50,54 by a battery-powered drive motor (FIG. 5) on the lower member 36 coupled to rollers 40 by any suitable drive shaft 62 and gears. When motors 60 are actuated by any suitable two-way switch or the like, a battery 64 is electrically connected to motors 60 for driving the motors in the proper directions for driving rollers 40 in either direction of rotation for laterally moving support frame 24 on the rails in either direction. The posts 32 of support frame 24 are provided on the inner sides thereof with grooves 66 (FIGS. 2 and 7) extending from one end to the other to form guideways for slidably receiving complementary elongated ribs 68 on the outside of rectangular elevator frame 28, now to be described.

The elevator frame 28, which is slidably supported by support frame 24, comprises side posts 70 connected at the top and bottom by upper and lower cross members 72,74, respectively. The afore-mentioned ribs 68 are secured to the outer sides of side members 70 (FIGS. 2, 7, and 9), and one side of each rib 68 is provided with gear teeth to form a gear rack 76 (FIG. 5). The elevator frame 28 is vertically moved up or down by a plurality of gears 78 in meshing engagement with gear racks 76, and mounted on shafts 80, journalled in side members 32. Sprockets 82 (FIG. 6) are mounted on shafts 80 and drivingly coupled to an endless chain 84 trained over the sprockets. The chain is driven by a battery-powered drive motor 86 coupled to one of the sprockets 82 by any suitable drive train, such as a plurality of intermeshing gears 88, belt 90, and the like. The drive motor 86 and drive train are covered by a semi-cylindrical shield 92. Accordingly, when drive motor 86 is energized for operation in either direction of rotation by any suitable double-throw switch or the like, gear rack 76 is driven by gears 78 in either direction for moving the elevator frame 28 up or down relative to support frame 24. The switch may be suitably mounted on the support frame. Although ribs 68 are on side members 72 and grooves 66 in side members 32, it is, of course, within the scope of the invention to reverse the position of the ribs and grooves.

Figure 10:
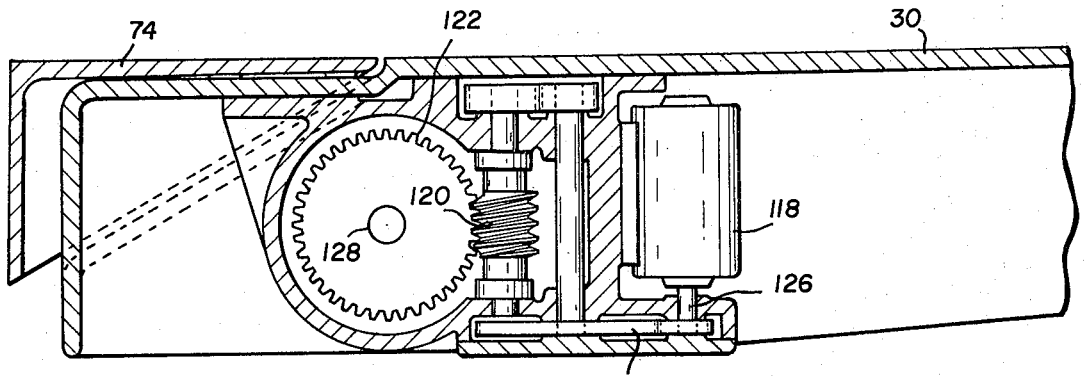
FIG. 10 is an enlarged, section view taken along line 10—10 of FIG. 8.

The substantially rectangular door 30 is supported by elevator frame 28 for pivotal movement between a closed position, in which the door blocks the opening in the rectangular elevator frame, and an open position, in which it provides a platform over which cargo may be transported through the opening. In the open position, the free pie-shaped end 96 of the door, which is hinged at line 98, is moved to the full line position shown in FIG. 2. Support rods 100 may be provided for supporting the door in its open position. Prior to movement of door 30 to its closed position, door end 96 is moved to the dotted position shown in FIG. 2. Each side of the door's lower end thereof is provided with a laterally extending journal 102 (FIG. 8) formed by two circular disks 104 separated by a circular spacer 106 having a peripheral notch 108 therein. The journals 102 extend into complementary sockets or bearings (FIGS. 7 and 9) at the lower ends of side members 70. Each socket comprises circular bearings 110,112 rotatably supporting the disks 104, bearing 112 having a ring gear 114 encircling spacer 106, and the bearings 110,112 and ring gear 114 all being fixed to side member 70. The door 94 is pivoted about the axis of journals 102 by a spur gear 116 (FIG. 9) positioned in spacer notch 108 in meshing engagement with ring gear 114. When spur gear 116 is rotated, it rotates on fixed ring gear 114, causing the door to which the spur gear is secured to pivot about the axis of journals 102. The spur gear 116 is driven by a drive means (FIGS. 8 and 10) mounted within door 30 comprising a battery-powered motor 118 coupled to spur gear 116 by any suitable drive train of gears 120,122,124, shafts 126,128, and the like.

Figure 12:
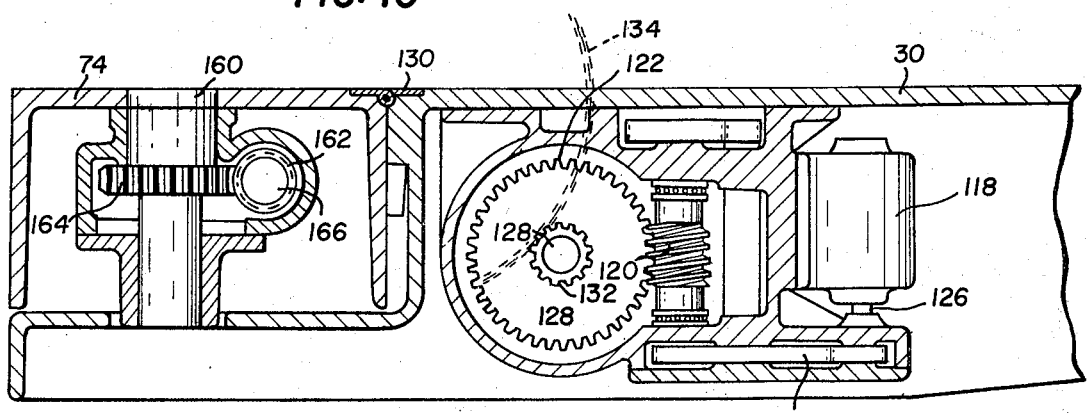
FIG. 12 is a section view taken substantially along line 12—12 of FIG. 11.
Figure 11:
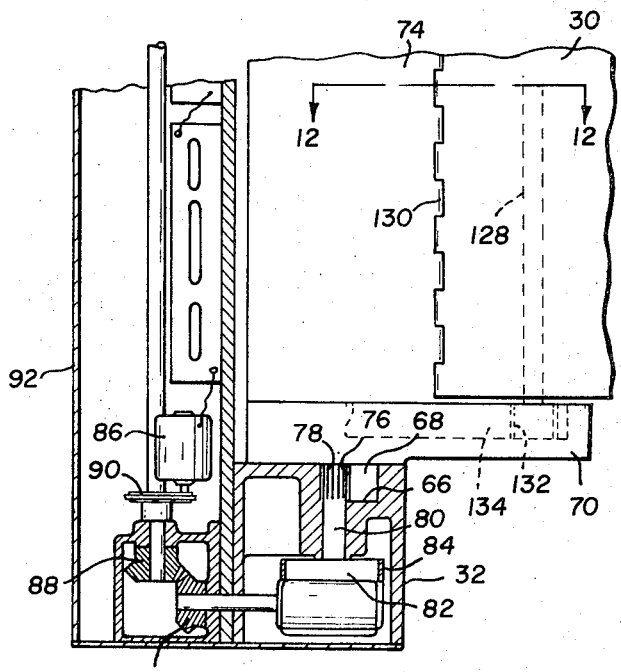
FIG. 11 is a segmental view similar to FIG. 7 illustrating another embodiment of the mechanism.

In an alternative pivotal mounting for the door, illustrated in FIGS. 11 and 12, the door 30 is hinged along tis lower edge by a hinge 130 to an edge of cross member 74, and the door is pivoted about hinge 130 by a spur gear 132 rotatably mounted on the door in meshing engagement with a large gear 134 secured to and recessed in side member 70. The spur gear 132 is driven in either direction of rotation by a drive means similar to the afore-mentioned drive means mounted within door 30, causing the door to be pivotally moved on hinge 130 between the open and closed positions. The drive means comprises a battery-powered motor 118 drivingly coupled to spur gear 132 by any suitable drive train comprising gears 120,122,124, shafts 126,128, and the like.

As an adjunct to the cargo handling mechanism, in order to minimize pilferage from an enclosing structure, the open side thereof may be provided with uniformly spaced posts 136 (FIGS. 3 and 13, sheet 3 of the drawings) hinged at the center at 138 and provided with studs 140 at each end adapted to fit into complementary holes in the frame of the enclosing structure. Once installed, posts 136 may be locked in position by any suitable latch bolts or the like inserted through a U-shaped latch member 142 on one leg of the post extending through a slot in a plate 144 secured to the other leg of the post. Each of the posts 136 are provided further with elongated grooves 146 along each side thereof adapted to mate with suitable grooves 148 in the enclosing structure to provide spaced guideways for supporting the edges of a flexible roll-away door 150 (FIG. 1). If desired, the enclosing structure 22 may be provided with vertically extending posts, not shown, having adjustable support brackets for supporting one or more cargo supporting platforms 152 at any desired vertical elevation to better utilize the space within the enclosing structure.

The cargo handling mechanism, as best seen in FIGS. 8 and 13, is further provided with one or more self-contained power take-off units 154 (FIG. 8) for driving external mechanisms, such as cargo movers 156 (FIG. 14, sheet 4 of the drawings) for moving cargo-supporting carts or the like. The power units comprise battery-powered motors 158 for driving a power shaft 160 through any suitable drive train of gears 162,164, shafts 166, or the like. The power shaft 160 extends through an opening in door 30 with the top thereof preferably level with the surface of the door, and further having any suitable diametrically opposed notches 168 or the like for receiving a drive pin 170 secured to a shaft 172 of a driven power converter 174 (FIG. 14, sheet 4 of the drawings). By electrically connecting a battery to the motor 158 through any suitable two-way switch or the like, the power shaft 160 and power converter 174 may be driven in either direction of rotation. The power converter 174 may be utilized for loading and unloading cargo from the enclosing structure 22 and comprises a housing 176 having one or more legs 178 insertable in openings in the door to prevent rotation of the housing on the door. The drive shaft 172 is coupled through a pair of bevel gears 180 to an elongated splined shaft 182 extending through a bearing 184 in the housing and a complementary splined opening in one of the bevel gears. The splined shaft 182 is slidably movable relative to the bearings 180,184, and has one end journalled in a housing 186 which rotatably supports a shaft 188 onto which wheels 190 are mounted. The splined shaft 182 and wheels 190 are drivingly coupled together by a pair of bevel gears 192, one secured to the end of splined shaft 182, and the other secured to wheel shaft 188. Accordingly, operation of drive motor 158 and power take-off shaft 160 causes movement to be imparted to wheels 190 in either direction of rotation, depending upon which direction the motor 158 is operating. A hook 194 on housing 186 is adapted to be secured to a cart or the like containing cargo for pulling or pushing the cargo across the door into or from the enclosing structure.

All of the batteries in the cargo handling mechanism are preferably connected in parallel to a single electrical plug which may be inserted in a motor socket for electrically connecting the batteries to all of the drive motors through the aforementioned switches. When the cargo handling mechanism is not being used, the plug may be disconnected from the motor socket, and connected to a battery charging socket connected to any suitable battery charging unit. Accordingly, the batteries can then be maintained in a fully charged condition at all times.

It is therefore evident that with the cargo handling mechanism of this invention, it is possible to move the mechanism laterally and/or vertically into any desired position relative to the open side of an enclosing structure, and then pivotally move the door to a desired position for loading or unloading cargo into or from the enclosing structure. The mechanism is completely self-contained with the power sources and controls contained in the mechanism. For loading or unloading heavy cargo, a power take-off unit on the mechanism may be used for driving any suitable cargo-handling cart or the like.

The invention has been described in detail with particular reference to preferred embodiments thereof, but it will be understood that variations and modifications can be effected within the spirit and scope of the invention as described hereinabove.

I claim:

1. In a cargo handling mechanism for use in loading or unloading an enclosing structure having an access opening therein, the combination comprising:

support frame means mountable on the enclosing structure for lateral movement across the access opening;

first drive means on said support means for imparting lateral movement to said support frame means;

elevator frame means mounted on said support frame means for reciprocal movement relative to said support frame means, said elevator frame means having a bearing and a fixed ring gear;

second drive means on one of said support and elevator frame means for imparting reciprocal movement to said elevator frame means;

a door mounted on said elevator frame means for pivotal movement between open and closed positions, said door having a laterally extending spindle received by said bearing and forming a pivot, said spindle extending into and encircled by said fixed ring gear and having a peripheral recess; and third drive means on said door comprising a drive gear in said peripheral recess in driving engagement with said fixed ring gear for imparting pivotal movement to said door.

2. The invention according to claim 1 wherein said first, second, and third drive means comprise battery-powered drive motors.

3. The invention according to claim 1 wherein said door is hingedly connected by a hinge to said elevator frame means; said fixed member of elevator frame means comprises a ring gear fixed thereto in which the center of said ring gear coincides with the axis of said hinge; and said third drive means comprises a drive gear on said door in driving engagement with said ring gear.

4. In a cargo handling mechanism for use in loading or unloading an enclosing structure having an access opening therein, the combination comprising:

support frame means mountable on the enclosing structure for lateral movement across the access opening;

first drive means on said support means for imparting lateral movement to said support frame means;

elevator frame means mounted on said support frame means for reciprocal movement relative to said support frame means, said elevator frame means having a ring gear fixed thereto;

second drive means on one of said support and elevator frame means for imparting reciprocal movement to said elevator frame means;

a door hingedly connected by a hinge to said elevator frame means for pivotal movement between open and closed positions in which said axis of said hinge coincides with the center of said ring gear; and third drive means on said door comprising a drive gear on said door in driving engagement with said ring gear for imparting pivotal movement to said door.

5. The invention according to claim 4 wherein said door further has a battery-powered power take-off means for driving auxiliary equipment.

6. The invention according to claim 1 and further including means comprising a pivotally mounted member on said support frame means for releasably mounting said support frame means on the enclosing structure.

7. The invention according to claim 1 wherein the enclosing structure has upper and lower guide rails above and below the access opening respectively, said support frame means has lower rollers ridable on said lower guide rail and upper rollers ridable on said upper guide rail, and one of said upper and lower rollers are pivotally moveable between a retracted position to permit mounting of said support frame means on said upper and lower rails of said enclosing structure, and an operative position in which said one of said upper and lower rollers engage the rear surface of its corresponding rail for releasably holding said support frame means on said enclosing structure.

8. In a cargo-handling mechanism for use in loading or unloading an enclosing structure having an access opening therein with guide rails on opposite sides thereof, the combination comprising:

a rectangular support frame;

means for releasably mounting said support frame on guide rails of an enclosing structure having an access opening for lateral movement across the access opening, said support frame having first side posts provided with elongated facing grooves;

first drive means on said support frame comprising a drive roller engageable with one of the guide rails for imparting lateral movement to said support frame;

a rectangular elevator frame slidably supported by said support frame, said elevator frame having second side posts, at least one of which is provided with a fixed ring gear, and an elongated rib slidably received by one of said grooves, said rib having a gear rack;

second drive means on said support frame comprising a drive gear drivingly coupled to said gear rack for imparting reciprocal movement to said elevator frame;

a door pivotally mounted on said elevator frame for movement between open and closed position; and third drive means mounted on said door and drivingly coupled to said fixed ring gear for imparting pivotal movement to said door relative to said elevator frame.

9. The invention according to claim 8 wherein said mounting means comprises a pivotally mounted support roller on said support frame movable from a normal guide rail disengaged position to a guide rail engaged position.

10. In a cargo handling mechanism for use in loading or unloading an enclosing structure having an access opening therein with guide rails on opposite sides thereof, the combination comprising:

a rectangular support frame mountable on the guide rails of the enclosing structure for lateral movement across the access opening, said support frame having first side posts provided with elongated facing grooves;

first drive means on said support frame comprising a drive roller engageable with one of the guide rails for imparting lateral movement to said support frame;

a rectangular elevator frame slidably supported by said support frame, said elevator frame having second side posts, at least one of which is provided with a bearing, a fixed ring gear, and an elongated rib slidably received by one of said grooves, said rib having a gear rack;

second drive means on said support frame comprising a drive gear drivingly coupled to said gear rack for imparting reciprocal movement to said elevator frame;

a door hingedly connected by a hinge to said elevator frame for movement between open and closed positions, said hinge axis being coincident with said ring gear; and third drive means on said door comprising a drive gear drivingly coupled to said ring gear for imparting pivotal movement to said door relative to said elevator frame.

* * * * *